INVENTOR
BRUCE W. BRUNSON
BY
ATTORNEYS

United States Patent Office 3,448,700
Patented June 10, 1969

3,448,700
OVEN WITH BAND CONVEYOR
Bruce W. Brunson, Grand Rapids, Mich., assignor to Werner Machinery Company, Grand Rapids, Mich., a corporation of Michigan
Filed Apr. 4, 1966, Ser. No. 539,788
Int. Cl. A21b 3/00
U.S. Cl. 107—57                    5 Claims

ABSTRACT OF THE DISCLOSURE

An oven having a solid non-pervious movable band conveyor running therethrough and provided with means for heating the compartment above the conveyor and below the conveyor at different temperatures, a longitudinal rail is provided extending along the space from each side of the oven. This rail is supported by non-pervious means which will prevent convection currents from flowing through the space formed between the rails and the oven walls. The rails have a relatively narrow bearing section on their upper surface for slidably supporting the solid conveyor band in sealing relationship. This combination provides a means for isolating a section of the oven above the conveyor band from the section of the oven below the conveyor band to prevent the flow of convection currents between the same.

---

This invention relates to baking ovens and, more particularly, to an assembly-line baking oven employing a conveyor traversing therethrough upon which the goods to be baked are placed.

It is customary in larger baking concerns to utilize assembly-line production methods whereby the goods are mixed, baked, cooled and packaged in one continuous operation. Such a process necessitates the utilization of a conveyor-type oven wherein the baking process takes place during the time interval required for a given section of the conveyor band upon which the goods are placed to pass completely through the oven. These ovens are generally heated by means of circulating air which is periodically reheated to maintain the desired temperature within the oven. It is possible, however, to utilize other well-known heat generating means. The ability to accurately control the temperature is essential to producing uniform goods for commercial distribution.

It has been found that the properties of many products may be improved if their lower surfaces are subjected to temperatures different from that to which their upper surfaces are subjected. Thus, the oven is sealed into two separate baking sections, one above and one below the conveyor band, and convection interchange between the two sections prevented, much more accurate and predictable results may be achieved during the baking process.

No satisfactory apparatus has existed previously for sealing baking ovens of the type described into separate upper and lower sections. Prior art ovens allow a relatively unrestricted interchange of heated air between these sections and, thus any attempt to supply heated air of different temperatures to the two sections has proved futile. Because of the overall dimensions of these types of ovens it is often necessary to utilize two separate burners for each of them. By utilizing the band seal apparatus, which is the subject of this invention, it is possible to utilize one of the burners to heat the lower section of the oven while utilizing the other burner to heat the top section thereof. This factor adds markedly to the accuracy of the temperature control within and between each of the oven sections.

It is an object of this invention to provide a band seal apparatus for utilization in an oven of the type described whereby the interior of the oven is effectively isolated into upper and lower baking sections.

It is an object of this invention to provide an oven having a band-seal apparatus whereby localized overheating of the band at the point of seal is eliminated.

It is an object of this invention to provide an oven having a band seal apparatus incorporating means for assuring that the band will not slide from the sealing mechanism.

It is an object of this invention to provide an oven utilizing a band seal apparatus wherein the sealer is contiguous with the lateral band supports which must be positioned at predetermined intervals along the length of the oven in order to provide lateral support for the band and goods placed thereon.

These as well as other objects of this invention will be clearly understood by reference to the following specification and accompanying drawings in which.

Briefly, this invention comprises an elongated oven having a movable conveyor band running therethrough upon which the articles to be baked are positioned. A band supporting structure comprising a longitudinal rail extends the entire length of the oven on each side thereof. The longitudinal rail is spaced from the edges of the oven and has an upper band bearing surface of relatively narrow cross-sectional dimensions adapted to slidably support the conveyor band. The narrowness of the bearing portion of the rails prevents localized overheating of the band and thus eliminates burning of the goods directly contacting the band segment adjacent or above the rail.

A plurality of lateral rails are provided additionally which extend inwardly from each of the longitudinal rails at discrete points therealong in converging fashion. These rails function to insure that the band will not slide from the longitudinal rails and one edge thereof fall downwardly into the oven in a diagonal manner. Means are provided whereby the band may be laterally supported across its entire width at discrete intervals along its traverse. These means are supported at the oven sides in such a manner that the seal effected by the longitudinal rails between the upper and lower sections of the oven is not disturbed.

Figure 1:
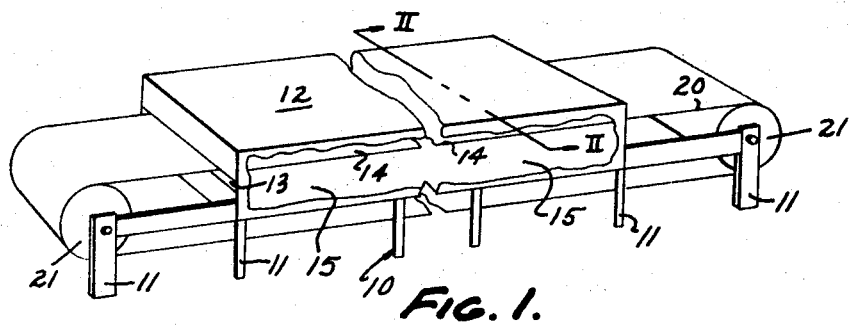
FIG. 1 is a somewhat schematic illustration indicating the environment in which the present invention finds primary use.

Referring now to the figures, a preferred embodiment of this invention will be described in detail. Referring initially to FIG. 1, there is shown a support assembly indicated generally by the reference numeral 10 having a plurality of vertical uprights 11. Upon vertical uprights 11 is supported a baking oven 12 having a band access slot 13 in one end thereof and a band exit slot (not shown) in the opposite end. The outside of the oven 12 is covered with a heavy layer of insulation 16 as is conventional within the art. A conveyor band 20 is mounted for endless rotation through the oven by any conventional means such as rollers 21. Some means (not shown) are provided for rotating this band. As will be noted from FIG. 1, the conveyor band 20 passes approximately through the vertical midpoint of the oven, thus dividing the oven into an upper chamber or section 14 and a lower section 15.

Referring now to FIGS. 2, 3, 4, and 5, the details of the band seal assembly 30 will be illustrated. Positioned longitudinally along the opposite sides of the oven at its approximate vertical midpoint are a pair of longitudinal L-shaped supports 31 which may be affixed to the oven housing by any conventional means such as riveting or welding. Affixed to the innermost section of the upper surface of supports 31 is a longitudinal sealing rail 32 having an arcuate bearing section 33. Converging inwardly from and affixed to each of the longitudinal sealing rails 32 are a plurality of lateral stabilization rails 34 which also have an arcuate bearing section 35 on their upper surfaces. Positioned at discrete locations along the length of the oven are a plurality of facing reinforcing plates 37 which provide additional support for the band slides 38 extending across the oven at those particular points so as to afford lateral support to the conveyor band 20. The band slides 38 are in the form of channular members having their concave surfaces facing downwardly. They are supported at their opposite extremities by a pair of inwardly extending supports 39 affixed directly to reinforcing plate 37. In this manner the load on longitudinal supports 31 does not exceed their bearing capabilities.

Preferably, the band seal assembly 30 consisting of longitudinal rail 32 and lateral stabilization rails 34 are cast in sections having a length equal to the predetermined distance between band supports 38. They may be affixed to the longitudinal supports 31 in any conventional manner such as by bolts 36 or, alternatively, a series of vertical supports (not shown) may be provided on longitudinal support 31 whereby the sealing assemblies may merely be placed in slots formed thereby so as to be easily removable for cleaning and replacement. By utilizing this type of arrangement, the first pair of facing seal arrangements 30 may be installed, a band support 38 installed, and another pair of facing seal assemblies 30 installed, etc. It has been found that on an oven having a width of approximately five feet, the longitudinal spacing between lateral stabilization rails 34 of eighteen inches is satisfactory. The band slides 38 should be placed approximately every five feet within the oven.

Once the band seal assemblies 30 have been installed, and the band slides 38 are placed, the conveyor band 20 is installed in the oven. As shown best in FIG. 2, the band rests directly upon the upper bearing surface 33 of longitudinal rails 32, the upper bearing surface 35 of lateral stabilization rails 34 and the upper surface of band slide 38. Since the vertical dimensions of the band slide 38 are equal to those of the longitudinal rails 32 and the lateral stabilization rails 34, an effective seal is obtained between the upper and lower sections of the oven, 14 and 15 respectively. In this manner, an interchange of air between the two sections is prevented and differential temperatures may be maintained in the upper and lower sections of the oven by conventional means such as by separate heaters previously referred to and shown in schematic as Heater I and Heater II (FIG. 2).

In operation, the goods to be baked are placed on the upper surface of conveyor band 21 adjacent the access entrance 13 of the oven. As the band rotates the goods are carried into the oven wherein they are subjected to desired differential temperatures along their upper and lower surfaces. There is little or no tendency for the goods to burn along the points where the conveyor band contacts the longitudinal and lateral stabilization rails because the relatively restricted cross-section of these rails on their bearing faces prevents localized overheating of the conveyor band. Thus, while the bearing section of the rails are shown as arcuate in cross-section, it will be apparent to those skilled in the art that any type of point or relatively restricted area contact device might be used. One such other device would be such a triangle with one of its verticies utilized as the bearing surface.

Figure 2:
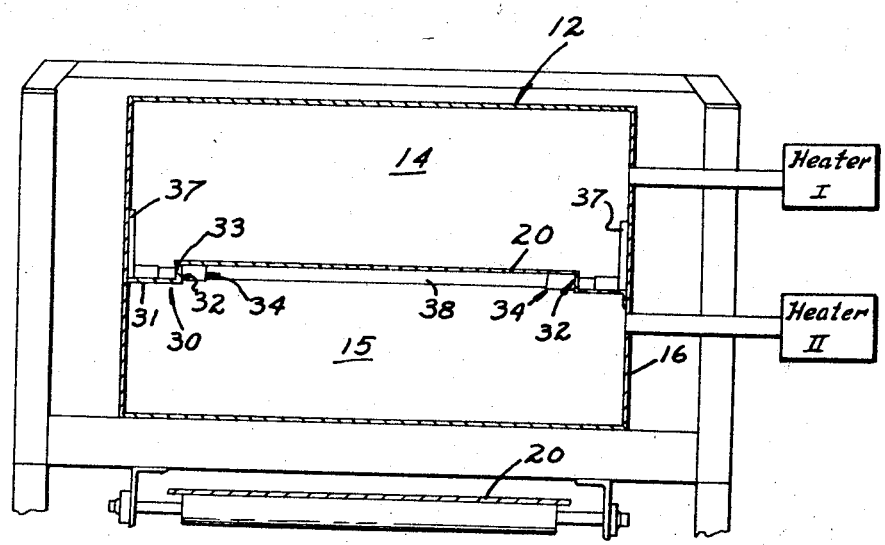
FIG. 2 is a cross-sectional view taken along line II—II of FIG. 1.
Figure 3:
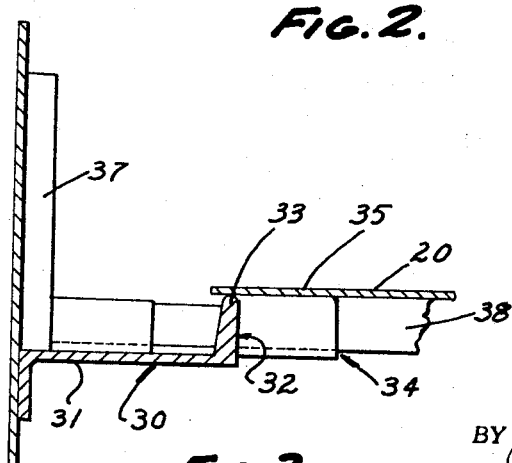
FIG. 3 is a fragmenary cross-section of the band seal apparatus at one side of the oven.
Figure 4:
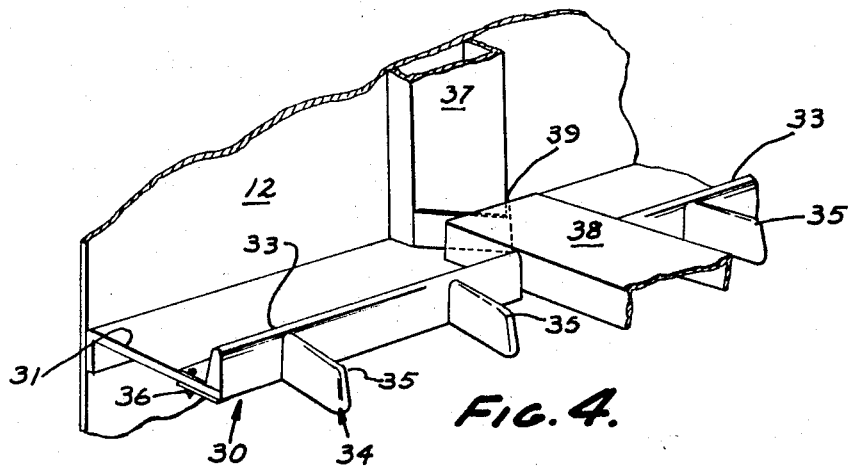
FIG. 4 is a perspective view of the band seal apparatus on one side of the oven.
Figure 5:
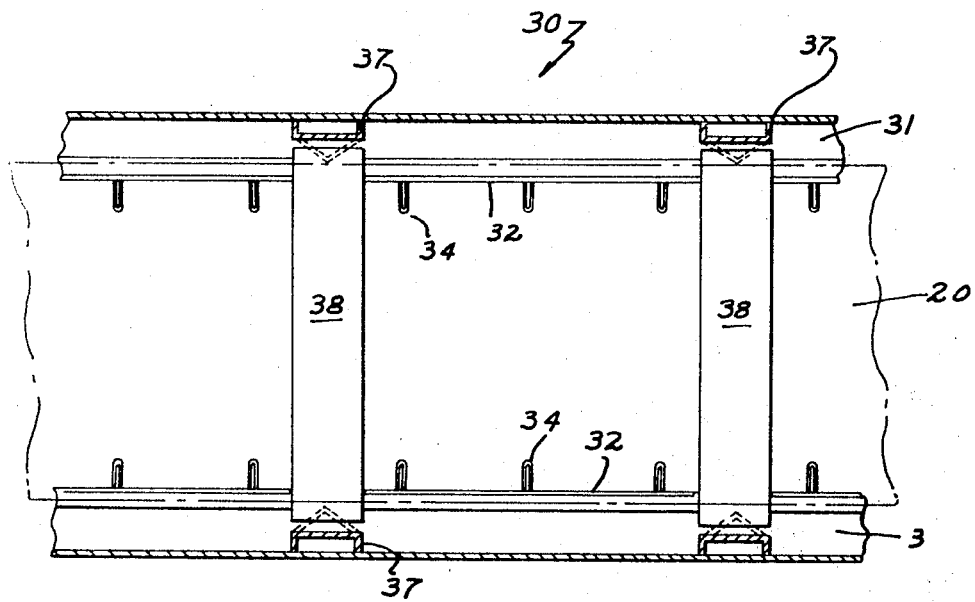
FIG. 5 is a plan view of the band seal apparatus.

In the event that the conveyor band 20 should move to the left or the right as viewed in FIG. 2, it will not be allowed to fall into the lower section of the oven 15 because of the presence of lateral stabilization rails 34. It would be possible, of course, to provide guides on the side of the conveyor band to prevent any lateral movement thereof. It has been found, however, that the provision of such guides often proves unsatisfactory in use because of imperfections in the conveyor band width, expansion and contraction differentials of the various components of the oven, and, perhaps most important, the tendency of the band to ride upward and away from longitudinal sealing rail 32. This latter tendency, of course, would allow convection currents of air to circulate between the upper and lower sections of the oven, precisely the phenomena which the apparatus of this invention was designed to prevent.

While a preferred embodiment of this invention has been illustrated in detail, it will be apparent to those skilled in the arts that many modifications thereof may be made without departing from the concepts disclosed herein. Such modifications are to be considered as included in the following claims unless these claims, by their language, expressly state otherwise.

I claim:
1. An oven comprising an oven heating compartment divided into a top and bottom chamber by a solid non-pervious movable conveyor band running in a horizontal direction therethrough upon which articles to be baked are positioned; said compartment having side walls; a band supporting structure comprising longitudinal rails extending along and spaced from each side wall of said compartment; said band having its edges spaced from said side walls; non-pervious means between said rails and said side walls of said compartment and coacting with said conveyor band for cutting off flow of convection currents between the top and bottom chambers of the compartment; said rails each having a relatively narrow bearing section on its upper surface underlying and slidably supporting said solid band conveyor in sealing relationship; means for heating each of said chambers at different temperatures; said solid band conveyor and said non-pervious means between said rails and said side walls of said oven in conjunction with each other preventing convection currents from flowing between said two different temperature chambers.

2. The apparatus as set forth in claim 1 in which the upper surfaces of said rails are arcuate in cross-section.

3. The apparatus as set forth in claim 1 which further comprises:
   a plurality of lateral rails affixed to each of said longitudinal rails, said lateral rails extending into the space between said longitudinal rails and each having a relatively narrow bearing section on its upper surface.

4. The apparatus as set forth in claim 3 in which the upper surfaces of said lateral rails are arcuate in cross-section.

5. The apparatus as set forth in claim 3 which further comprises a plurality of band slide elements extending between the side walls of said oven, the upper bearing surfaces of said band-slide elements being co-planar with the upper surfaces of said longitudinal and lateral rails.

References Cited

UNITED STATES PATENTS

| | | | |
|---|---|---|---|
| 441,961 | 12/1890 | Mohring | 107—57 |
| 838,270 | 11/1906 | Peters | 107—57 |
| 1,844,178 | 2/1932 | Reese | 107—57 |
| 2,969,870 | 1/1961 | Pulver | 198—135 |

ROBERT W. MICHELL, *Primary Examiner.*

JOSEPH SHEA, *Assistant Examiner.*

U.S. Cl. X.R.

263—8